United States Patent
Sorensson et al.

(10) Patent No.: US 8,174,489 B2
(45) Date of Patent: May 8, 2012

(54) DUAL-SIDED DISPLAY FOR MOBILE DEVICE

(75) Inventors: Stefan Sorensson, Sodra Sanby (SE); Ola Thorn, Malmo (SE)

(73) Assignee: Sony Mobile Communications AB, Lund (SE)

(*) Notice: Subject to any disclaimer, the term of this patent is extended or adjusted under 35 U.S.C. 154(b) by 1099 days.

(21) Appl. No.: 12/042,899

(22) Filed: Mar. 5, 2008

(65) Prior Publication Data
US 2009/0231662 A1    Sep. 17, 2009

(51) Int. Cl.
  *G09G 3/38* (2006.01)
  *G09G 5/00* (2006.01)
  *G09G 3/19* (2006.01)
  *G02F 1/15* (2006.01)
(52) U.S. Cl. ............... 345/105; 345/4; 345/49; 359/265
(58) Field of Classification Search .............. 345/4, 30, 345/48, 49, 105; 359/245, 265; 257/428
See application file for complete search history.

(56) References Cited

U.S. PATENT DOCUMENTS

| | | | |
|---|---|---|---|
| 6,437,900 | B1 | 8/2002 | Cornelissen et al. |
| 6,647,366 | B2 | 11/2003 | Wang et al. |
| 6,822,778 | B2 | 11/2004 | Westfall et al. |
| 6,925,313 | B2 | 8/2005 | Kweon et al. |
| 2003/0007372 | A1 | 1/2003 | Porter et al. |
| 2008/0002115 | A1 | 1/2008 | Polak |

FOREIGN PATENT DOCUMENTS

| | | |
|---|---|---|
| EP | 1 511 275 A1 | 3/2005 |
| JP | 4-60582 | 2/1992 |
| JP | 2003-140574 | 5/2003 |
| JP | 2003-186426 | 7/2003 |
| JP | 2005-70668 | 3/2005 |
| WO | WO 02/071131 A2 | 9/2002 |

OTHER PUBLICATIONS

Notification of Transmittal of the International Search Report and the Written Opinion of the International Searching Authority, or the Declaration corresponding to PCT/IB2008/053568, Feb. 20, 2009, 15 pages.
Richardson et al., "Switchable Mirrors Based on Nickel-Magnesium Films", University of California, Accepted for publication in Applied Physics Letters, Jan. 2001, 8 pages.
Slack et al., "Metal Hydride Switchable Mirrors: Factors Influencing Dynamic Range and Stability", Solar Energy Materials & Solar Cells, vol. 90, Issue 4, Mar. 3, 2006, pp. 485-490.
Deb, "Photovoltaic-Integrated Electrochromic Device for Smart-Window Applications", National Renewable Energy Laboratory Conference Paper to be held Jul. 1-7, 2000, May 2000, 9 pages.

*Primary Examiner* — Srilakshmi K Kumar
(74) *Attorney, Agent, or Firm* — Snyder, Clark, Lesch & Chung, LLP

(57) ABSTRACT

A method and device for providing a dual-sided display device having increased viewability are provided. A display device includes a dual-sided display assembly and a power supply. The dual-sided display assembly includes a first viewable side and a second viewable side. A first electrochromic layer is formed over the first viewable side and a second electrochromic layer is formed over the second viewable side. Each of the first electrochromic layer and the second electrochromic layer are switchable between a substantially transparent state and a substantially reflective state upon application of a switching voltage from the power supply, the state being selected based on an operational configuration of the display device.

15 Claims, 7 Drawing Sheets

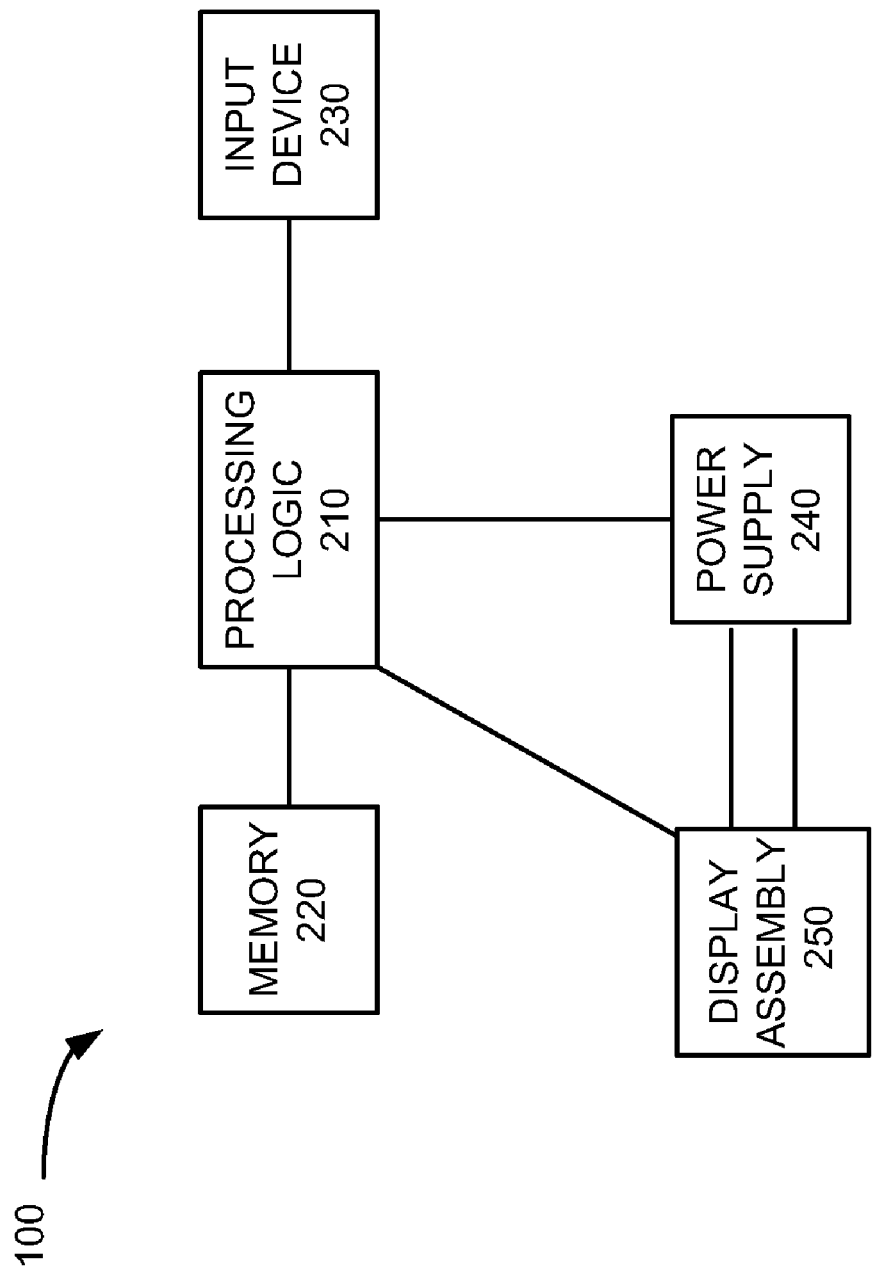

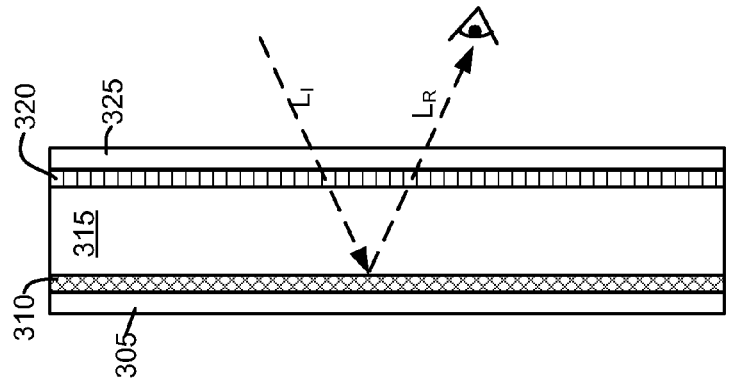
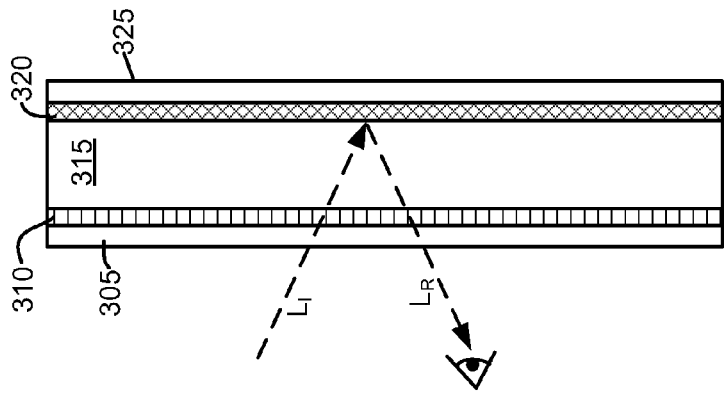
FIG. 3B
FIG. 3A

DUAL-SIDED DISPLAY FOR MOBILE DEVICE

BACKGROUND

The popularity and use of mobile terminals or mobile telephones has skyrocketed over the past 20 years. Although variations exist, these devices typically include one or more display devices, such as a liquid crystal display (LCD), an organic light emitting diode (OLED) display, etc., for presenting visual information to a user. In some implementations, the display may include one or more touch screen portions for receiving input from the user. For devices incorporating more than one display, the displays may be provided on opposing sides of a common housing, such as a top or flip portion of a flip or clamshell style mobile telephone.

Furthermore, these devices are often designed to be used or operated in a variety of different lighting environments, such as indoors, under incandescent or fluorescent lighting; outdoors in direct sunlight; in the dark, etc. Accordingly, visibility of the displays may differ, based on the light conditions in which the device is to be used. For dark or incandescently lit environments, the displays may be provided with one or more backlighting systems that illuminate the displays. Unfortunately, backlighting alone may be insufficient to adequately illuminate a display in high brightness environments, such as in direct sunlight.

SUMMARY OF THE INVENTION

According to an embodiment consistent with principles of the invention, a display device may be provided. The display device may include a dual-sided display assembly having a first viewable side and a second viewable side and a power supply. A first electrochromic layer may be formed over the first viewable side and a second electrochromic layer may be formed over the second viewable side. Each of the first electrochromic layer and the second electrochromic layer may be switchable between a substantially transparent state and a substantially reflective state upon application of a switching voltage from the power supply, the state being selected based on an operational configuration of the display device.

Additionally, the display device may include logic configured to control the display device, the logic providing a first operational configuration comprising placing the first electrochromic layer into the substantially transparent state and placing the second electrochromic layer into a substantially reflective state, such that viewing of the dual-sided display assembly from the first viewable side is enhanced by reflection of ambient incident light by the second electrochromic layer.

Additionally, the logic may be further configured to provide a second operational configuration comprising placing the first electrochromic layer into the substantially reflective state and placing the second electrochromic layer into a substantially transparent state, such that viewing of the dual-sided display assembly from the second viewable side is enhanced by reflection of ambient incident light by the first electrochromic layer.

Additionally, the logic may be further configured to determine the operational configuration based on a physical orientation of the display device.

Additionally, the dual-sided display assembly may include a dual-sided liquid crystal display assembly.

Additionally, the dual-sided display assembly may include a backlighting assembly to distribute light from a light source within the dual-sided display.

Additionally, the backlighting assembly may be further configured to provide a direct backlight to the first viewable side and an indirect backlight to the second viewable side, wherein the indirect backlighting comprises reflecting of the backlight off of the first electrochromic layer while in the first electrochromic layer is in the substantially reflective state.

Additionally, the dual-sided display assembly may include a first display; a backlighting assembly formed over the first display to distribute light from a light source directly through the first display; and a second display formed over the backlighting assembly, where the first electrochromic layer is formed over the first display, and the second electrochromic layer is formed over the second display.

Additionally, the first electrochromic layer and the second electrochromic layer may comprise a reflective transition metal hydride.

Additionally, the reflective transition metal hydride may include a magnesium nickel alloy.

Additionally, each of the first electrochromic layer and the second electrochromic layer may include a first transparent conductor layer; an ion storage layer formed over the first transparent conductor layer; an ion conducting layer formed over the ion storage layer; a reflective electrochromic layer formed over the ion conducting layer; and a second transparent conductor layer formed over the reflective electrochromic layer, where the ion storage layer and the reflective electrochromic layer are configured to receive the switching voltage from the power supply.

Additionally, each of the first electrochromic layer and the second electrochromic layer may exhibit reflectance of approximately 80-100% while in the substantially reflective state and transmittance of approximately 80-100% while in the substantially transparent state.

According to another aspect, a mobile terminal may include a main housing including a processor and a power supply and a flip housing hingedly connected to the main housing. The flip housing may include a dual-sided display assembly having an inner display and an outer display, where the inner display is viewable from a first side of the flip housing and the outer display is viewable from a second side of the flip housing; an outer electrochromic layer formed over the outer display; and an inner electrochromic layer formed over the inner display. Each of the outer electrochromic layer and the inner electrochromic layer may be switchable between a substantially transparent state and a substantially reflective state upon a command from the processor to apply a switching voltage from the power supply to the outer electrochromic layer or the inner electrochromic layer, the state being selected based on an operational mode of the mobile terminal.

Additionally, the dual-sided display assembly may further include a backlighting assembly formed between the inner display and the outer display to distribute light from a light source directly through the inner display.

Additionally, each of the inner electrochromic layer and the outer electrochromic layer may include at least a reflective transition metal hydride.

Additionally, the operational mode of the mobile terminal may be based on a position of the flip housing relative to the main housing.

Additionally, the mobile terminal may include a first light sensor associated with the main housing to monitor ambient light conditions relative to the main housing; and a second light sensor associated with the flip housing to monitor ambient light conditions relative to the flip housing, where the operational mode of the mobile terminal is based on relative values associated with the first light sensor and the second light sensor.

According to yet another aspect, a method may include determining whether a dual-sided liquid crystal display is in a first operational mode for viewing a first viewable side of the dual-sided liquid crystal display or a second operational mode for viewing a second viewable side of the dual-sided liquid crystal display. When it is determined that the dual-sided liquid crystal display is in the first operational mode, a first electrochromic layer formed over the first viewable side of the dual-sided liquid crystal display maybe placed into a substantially transparent state; and a second electrochromic layer formed over the second viewable side of the dual-sided liquid crystal display may be placed into a substantially reflective state. When it is determined that the dual-sided liquid crystal display is in the second operational mode, the first electrochromic layer formed over the first viewable side of the dual-sided liquid crystal display may be placed into a substantially reflective state, and the second electrochromic layer formed over the second viewable side of the dual-sided liquid crystal display may be placed into a substantially transparent state.

Additionally, determining whether the dual-sided liquid crystal display is in the first operational mode or the second operational mode may include monitoring a physical orientation of the dual-sided liquid crystal display.

Additionally, determining whether the dual-sided liquid crystal display is in the first operational mode or the second operational mode may include monitoring ambient light incident upon the first viewable side of the dual-sided liquid crystal display and the second viewable side of the dual-sided liquid crystal display; determining that the dual-sided liquid crystal display is in the first operational mode when more ambient light is incident upon the first viewable side of the dual-sided liquid crystal display than is incident on the second viewable side of the dual-sided liquid crystal display; and determining that the dual-sided liquid crystal display is in the second operational mode when more ambient light is incident upon the second viewable side of the dual-sided liquid crystal display than is incident on the first viewable side of the dual-sided liquid crystal display.

BRIEF DESCRIPTION OF THE DRAWINGS

Reference is made to the attached drawings, wherein elements having the same reference number designation may represent like elements throughout.

FIG. 2 is a block diagram illustrating components of the mobile terminal of FIGS. 1A and 1B according to an exemplary implementation consistent with the invention;

FIGS. 3A and 3B are side views of the display assembly of FIGS. 1A and 1B in various modes of configuration;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1B:
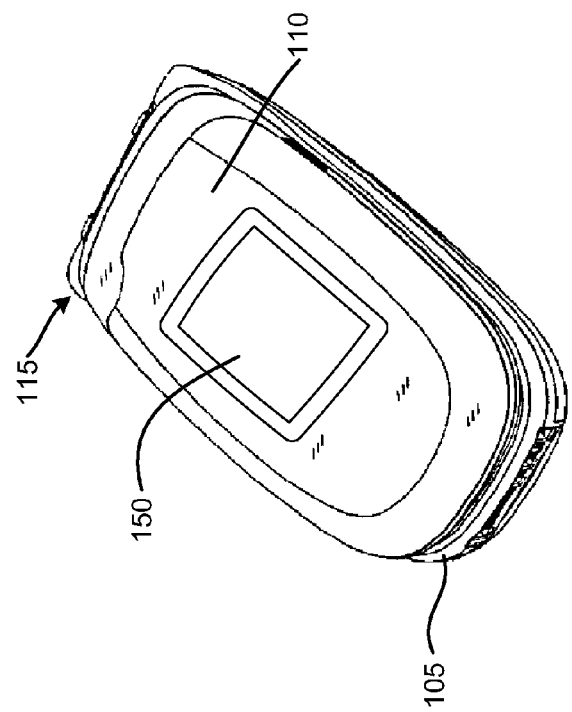
FIGS. 1A and 1B are front views of an exemplary mobile terminal in which methods and systems consistent with the invention may be implemented.
Figure 1A:
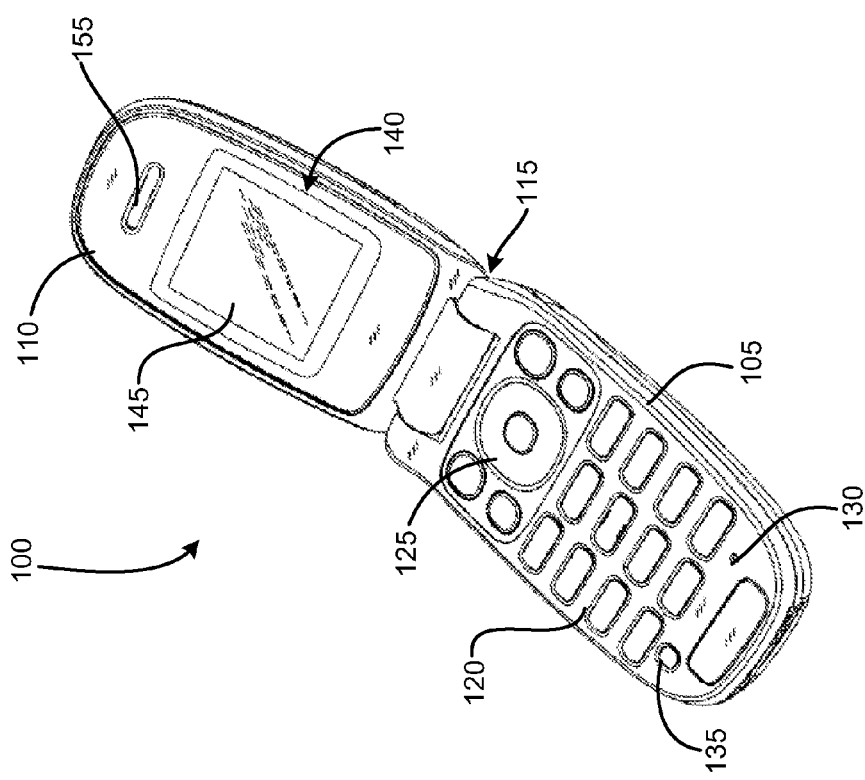

FIGS. 1A and 1B are front views of an exemplary mobile terminal device 100 in which systems and methods consistent with embodiments described herein may be implemented. The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Mobile terminal 100 may also optionally include a camera. Moreover, mobile terminals may include a wide variety of form factors including, candy bar, clamshell, flip, slider, and swivel or pivot style. It should be understood that the embodiments described herein may be applied to mobile terminals regardless of form factor.

Referring to FIG. 1A, mobile terminal 100 may include a flip or clamshell style mobile device illustrated in an open configuration, while FIG. 1B illustrates mobile terminal 100 in a closed configuration. Mobile terminal 100 may include a main housing 105 and a flip housing 110 connected by hinge element 115. Main housing 105 may include keypad 120, control keys 125, microphone 130, and light sensor 135. Main housing 105 may include a structure configured to hold devices and components used in mobile terminal 100. For example, main housing 105 may be formed from plastic, metal, or composite and may be configured to support keypad 120, control keys 125, microphone 130, and light sensor 135, as well as additional elements not shown in FIG. 1A, such as a rechargeable battery or power source, on or more wireless transceivers, and a number of circuit or processor elements configured to facilitate operation of mobile terminal 100. Flip housing 110 may include a display assembly 140 including an inner display 145 and an outer display 150 (shown in FIG. 1B), and a speaker 155. Additional elements relating to flip housing 110 and display assembly 140 will be set forth in additional detail below with respect to FIGS. 3A-5.

Keypad 120 may include devices and/or logic that can be used to operate mobile terminal 100. Keypad 120 may further be adapted to receive user inputs, directly or via other devices, such as via a stylus for entering information into mobile terminal 100. In one implementation, communication functions of mobile terminal 100 may be controlled by activating keys in keypad 120. The keys may have key information associated therewith, such as numbers, letters, symbols, etc. The user may operate keys in keypad 120 to place calls, enter digits, commands, and text messages, into mobile terminal 100. Designated functions of keys may form and/or manipulate images that may be displayed on display(s) 145 and/or 150.

Control keys 125 may include buttons that permit a user to interact with communication device 100 to cause communication device 100 to perform specified actions, such as to interact with displays 145 and 150, etc. For example, user manipulation of control keys 125 may cause elements of a user interface provided on displays 145 and/or 150 to be highlighted or selected, thereby enabling subsequent interaction with the selected element or elements.

Microphone 130 may include a device that converts speech or other acoustic signals into electrical signals for use by mobile terminal 100. Microphone 130 may also include an analog-to-digital converter to convert input analog signals into digital signals. Microphone 130 may be located anywhere on mobile terminal 100 and may be configured, for example, to convert spoken words or phrases into electrical signals for use by mobile terminal 100.

Light sensor 135 may include a device for detecting ambient light or light directed toward light sensor 135. In one implementation, light sensor 135 may be sensitive to variations in detected light using any suitable technology, such as photodiodes or other photoelectric components.

Speaker 155 may include a device that provides audible information or alerts to a user of mobile terminal 100. Speaker 155 may be located anywhere on mobile terminal 100 and may function, for example, as an earpiece when a user communicates using mobile terminal 100. Speaker 155 may include several speaker elements provided at various locations within mobile terminal 100. Speaker 155 may also include a digital-to-analog converter to convert digital signals into analog signals. Speaker 155 may also function as an output device for a ringing signal indicating that an incoming call is being received by communication device 100. Additionally, speaker 155 may function as an output device for audible alerts indicating receipt of text or multimedia messages, emails, or instant messages, as well as alerts indicating occurrence of reminders or the like.

Display assembly 140 may include one or more devices that provide visual images or information to a user. For example, inner display 145 may provide graphic information regarding incoming/outgoing calls, text messages, games, phonebooks, the current date/time, volume settings, etc., to a user of mobile terminal 100, while mobile terminal 100 is in an open configuration. Outer display 150 may provide similar graphic or visual information to the user while mobile terminal 100 is in a closed configuration. Implementations of displays 145 and/or 150 may be implemented as black and white or color flat panel displays, such as liquid crystal displays, etc.

In one implementation consistent with embodiments described herein, inner display 145 and outer display 150 of display assembly 140 may be formed as a dual-sided liquid crystal display where inner display 145 and outer display 150 are formed in combination with each other, such as with shared components configured to reduce cost, size, and power requirements of mobile terminal 100. Additional elements relating to flip housing 110, inner display 140, and outer display 150 will be set forth in additional detail below with respect to FIGS. 3A-5.

FIG. 2 is a diagram illustrating some components of mobile terminal 100 according to an exemplary implementation consistent with the described embodiments. Mobile terminal 100 may include processing logic 210, memory 220, input device 230, power supply 240, and display assembly 250. One skilled in the art would recognize that the mobile terminal 100 may be configured in a number of other ways and may include other or different elements, such as one or more radio frequency (RF) antennas, a transceiver, modulator/demodulator, encoder/decoder, a speaker, etc.

Processing logic 210 may include a processor, microprocessor, an application specific integrated circuit (ASIC), field programmable gate array (FPGA) or the like. Processing logic 210 may execute software programs or data structures to control operation of mobile terminal 100. Memory 220 may include a random access memory (RAM) or another type of dynamic storage device that stores information and instructions for execution by processing logic 210; a read only memory (ROM) or another type of static storage device that stores static information and instructions for use by processing logic 210; and/or some other type of magnetic or optical recording medium and its corresponding drive. Instructions used by processing logic 210 may also, or alternatively, be stored in another type of computer-readable medium accessible by processing logic 210. A computer-readable medium may include one or more memory devices and/or carrier waves.

Input device 230 may include any mechanism that permits an operator to input information to mobile terminal 100, such as a microphone, a keyboard, a keypad, a mouse, a pen, stylus, touch screen display, voice recognition and/or biometric mechanisms, etc. Input device 230 may also include one or more buttons that allows a user to receive a menu of options associated with, for example, display assembly 250.

Power supply 240 may supply power to components of mobile terminal 100, such as display assembly 250. Display assembly 250 may include hardware and/or software components associated with display assembly 140. For example, display assembly 250 may include one or more displays to facilitate the display of various types of information to a user including, for example, telephone call information, phone or address book information, etc. Additionally, display assembly 250 may provide one or more high resolution interfaces for viewing interactive menus, web browsers, photographs, etc. As mentioned briefly above, display assembly 250 may include a dual-sided liquid crystal display having an inner display viewable during a first orientation or configuration and an outer display viewable during a second orientation or configuration. In one exemplary implementation consistent with embodiments described herein, display assembly 250 may be configured to provide enhanced viewability of the inner and outer displays in different lighting environments. Specificities of display assembly 250 will be described in detail below.

In one embodiment, mobile terminal 100, may perform processing associated with, for example, dynamically modifying an operation or configuration of display assembly 250 (e.g., display assembly 140 of FIGS. 1A and 1B). Mobile terminal 100 may perform these operations in response to processing logic 210 executing sequences of instructions contained in a computer-readable medium, such as memory 220 and optionally in response to user interaction through input device 230. It should be understood that a computer-readable medium may include one or more memory devices. Execution of sequences of instructions contained in memory 220 causes processing logic 210 and/or display assembly 250 to perform operations that will be described hereafter. As described below, hard-wired circuitry may be used in combination with software instructions to implement processes consistent with embodiments described herein. Thus, implementations consistent with embodiments described herein are not limited to any specific combination of hardware circuitry and software.

FIG. 3A is a side view of display assembly 140 of FIGS. 1A and 1B when flip housing 110 is in a closed configuration (i.e., outer display 150 is viewable) according to one implementation consistent with embodiments described herein.

FIG. 3B is a side view of display assembly 140 of FIGS. 1A and 1B when flip housing 110 is in an open configuration (i.e., inner display 145 is viewable) according to one implementation consistent with embodiments described herein. As illustrated in FIGS. 3A and 3B, display assembly 140 may include transparent outer cover 305, outer electrochromic layer 310, substantially transparent liquid crystal assembly 315, inner electrochromic layer 320, and transparent inner cover 325. As described above, display assembly 140 may be included or incorporated within flip housing 110 of mobile terminal 100 as shown in FIGS. 1A and 1B. In one exemplary implementation, flip housing 110 may include one or more windows or openings formed therein configured to enable at least a portion of inner transparent cover 325 and outer transparent cover 305, respectively, to be visible from outside of mobile terminal 100.

Consistent with embodiments described herein, outer electrochromic layer 310 and inner electrochromic layer 320 may include structures and materials configured to alternatively transition between reflective and transparent states upon application of a suitable voltage (or current) (e.g., from power supply 240) to either of layers 310 or 320. Details regarding electrochromic layers 310 and 320 are set forth in additional detail below.

As illustrated in FIG. 3A, when mobile terminal 100 is in a closed configuration (e.g., flip housing 110 is closed relative to main housing 105), outer electrochromic layer 310 may be provided in, or transitioned to, a substantially transparent state, while inner electrochromic layer 320 may be provided in, or transitioned to, a substantially reflective state. In some implementations, this configuration may be a default configuration associated with mobile terminal 100, thereby affording maximum visibility of outer display 150 while in an essentially passive state and without requiring interaction by a user. Alternatively, transitioning into this configuration may be made upon closure of flip housing 110 relative to main housing 105 or upon user selection of a display option. In other implementations, ambient condition information, for example information received via light sensor 135 may be used to trigger the above-described transition.

As illustrated, in the closed or default configuration of FIG. 3A, ambient light incident upon transparent outer cover 305 (designated by arrow ($L_I$) in FIG. 3A) may pass through outer electrochromic layer 310 and liquid crystal assembly 315 and reflect off of inner electrochromic layer 320. The reflected light (designated by arrow ($L_R$) in FIG. 3A) may pass back through liquid crystal assembly 315, outer electrochromic layer 310, and outer cover 305 thereby increasing visibility of information presented on liquid crystal assembly 315 to a viewer, particularly within environments having high levels of ambient light.

In the open configuration of FIG. 3B, outer electrochromic layer 310 may be transitioned to a substantially reflective state, while inner electrochromic layer 320 may be transitioned to a substantially transparent state. In one implementation, transitioning into the open configuration may be made upon opening of flip housing 110 relative to main housing 105 or upon user selection of a display option. In other implementations, ambient condition information, for example information received via light sensor 135 may be used to trigger the above-described transition. In yet another implementation, a gyroscope or other motion sensing device may be used to trigger the transitions associated with the open configuration.

As illustrated, in the open configuration of FIG. 3B, ambient light incident upon transparent inner cover 325 (designated by arrow ($L_I$) in FIG. 3B) may pass through inner electrochromic layer 320 and liquid crystal assembly 315 and reflect off of outer electrochromic layer 310. The reflected light (designated by arrow ($L_R$) in FIG. 3B) may pass back through liquid crystal assembly 315, inner electrochromic layer 320, and transparent inner cover 325, thereby increasing the visibility of information displayed on liquid crystal assembly 315 to a viewer.

Consistent with embodiments described herein, liquid crystal assembly 315 may include any suitable liquid crystal display technology, such as active or passive matrix thin film transistor (TFT) liquid crystal displays. FIG. 4A illustrates one exemplary implementation of a liquid crystal assembly 315 consistent with implementations described herein. As illustrated in FIG. 4A, liquid crystal assembly 315 may include a dual-sided liquid crystal display 410 (e.g., a single twisted nematic LCD), a light guide layer 415, and a light source 420. Dual-sided LCD 410 may be configured to provide visual information on each side of liquid crystal display assembly depending on a state of dual-sided LCD 410. Light guide layer 415 may include a light dispersion layer configured to uniformly distribute light from light source 420. For example, light guide layer 415 may include a prism-type light dispersing element. In one implementation, light source 420 may include a side edge type back light device. Consistent with embodiments described herein, dual-sided LCD 410 and light guide layer 415 may be substantially transparent to light passing through either of outer electrochromic layer 310 or inner electrochromic layer 320, depending on a mode of operation of mobile terminal 100.

Figure 4B:
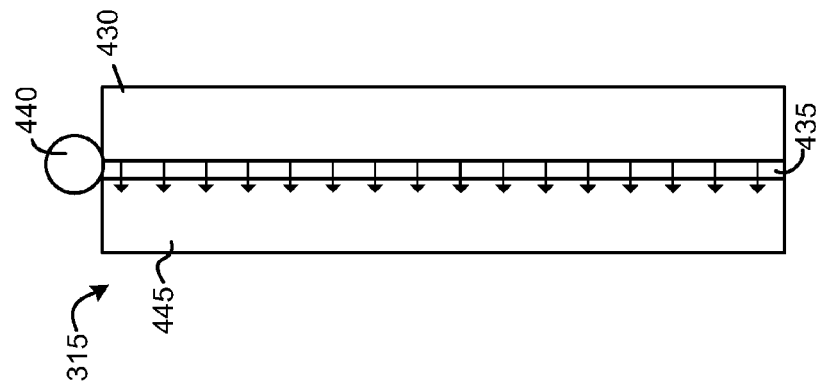
FIGS. 4A and 4B are side views of exemplary implementations of the display assembly of FIGS. 3A and 3B.
Figure 4A:
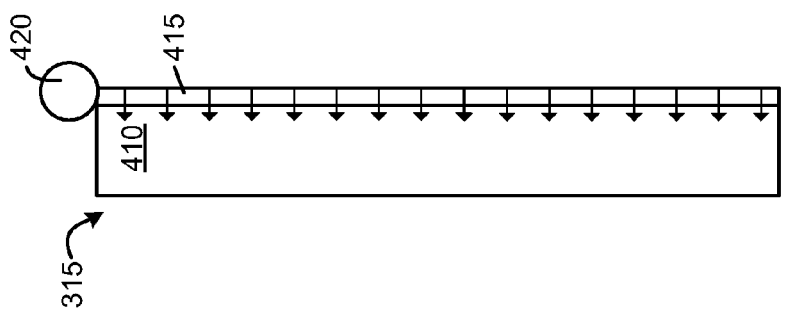

FIG. 4B illustrates another exemplary implementation of a liquid crystal assembly 315 consistent with implementations described herein. As illustrated in FIG. 4B, liquid crystal assembly 315 may include an inner liquid crystal assembly 430, a light guide layer 435, a light source 440, and an outer liquid crystal assembly 445. Consistent with embodiments described herein, each of inner liquid crystal display assembly 430 and outer liquid crystal display assembly 445 as well as light guide layer 435 may be substantially transparent to light passing through either of outer electrochromic layer 310 or inner electrochromic layer 320. Depending on an operational mode of mobile terminal 100, information may be displayed on either of inner liquid crystal display assembly 430 and outer liquid crystal display assembly 445. For example, while in a closed configuration, outer liquid crystal assembly 445 may be active, while inner liquid crystal assembly 430 may be inactive. Alternatively, in an open configuration, inner liquid crystal assembly 430 may be active, while outer liquid crystal assembly 445 may be inactive.

Light guide layer 435 may include a light dispersion layer configured to uniformly distribute light from light source 440. For example, light guide layer 435 may include a prism-type light dispersing element. In one implementation, light source 440 may include a side edge type back light device. As illustrated, light guide layer 435 may configured to provide direct backlighting to inner liquid crystal assembly 430 and indirect backlighting to outer liquid crystal assembly 445 via reflection from inner electrochromic layer 320.

Figure 5:
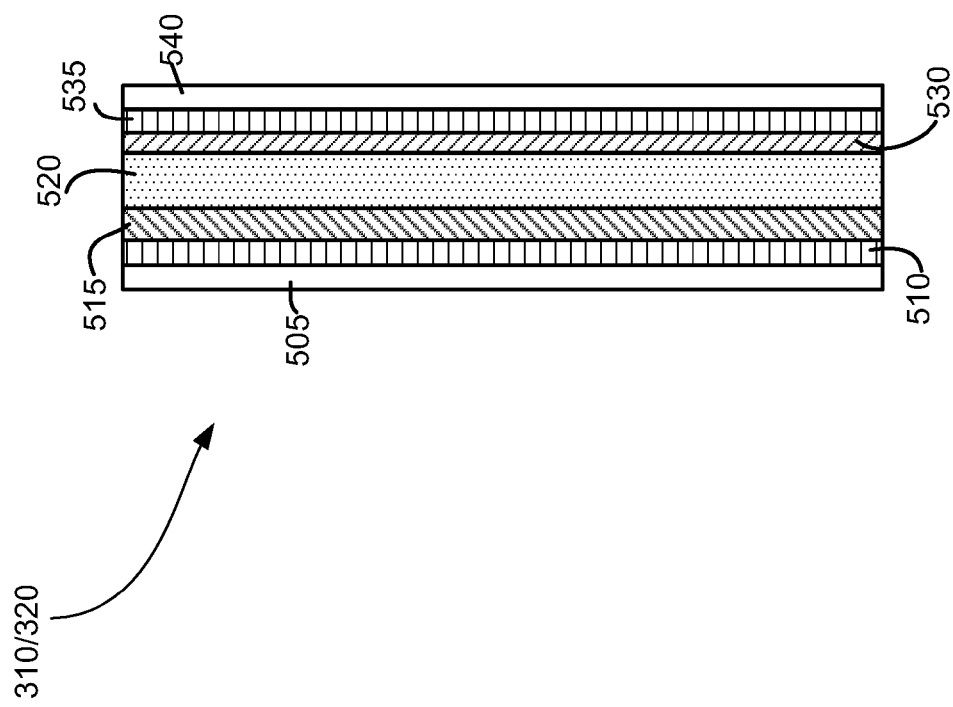
FIG. 5 is a side view of an exemplary implementation of the electrochromic layers of FIGS. 3A and 3B.

FIG. 5 illustrates one exemplary implementation of electrochromic layers 310 and 320 consistent with implementations described herein. As illustrated in FIG. 5, each of electrochromic layers 310 and 320 may include glass substrate 505, first transparent conductor layer 510, ion storage layer 515, ion conducting/electrolyte layer 520, electrochromic layer 530, second transparent conductor layer 535, and transparent substrate 540. In some implementations, glass substrate 505 may be included in liquid crystal assembly 315. In such an implementation, layers 510-540 may be applied as one or more films to opposing sides of liquid crystal assembly 315.

In one embodiment, transparent conductor layers 510 and 535 may include any suitable transparent conductive material, such as indium tin oxide (ITO). Conductor layers 510 and 535 may be formed via any suitable process, such as sputtering, on layers 505 and 530, respectively. Ion storage layer 515 may include a substantially transparent material, such as hydrated nickel oxide, vanadium pentoxide, etc., implanted with ions, the presence of which in electrochromic layer 530 effects the desired changed in optical characteristics. For example, ion storage layer 515 may be implanted with atoms of materials, such as lithium, sodium, silver, potassium, magnesium, or hydrogen.

Electrochromic layer 530 may include a reflective transition metal hydride material or alloy, such as a nickel magnesium alloy, etc. In a natural state, the reflective transition metal hydride material of layer 530 exists in a reflective state. However, upon application of a suitable voltage or current across ion storage layer 515 and electrochromic layer 530, at least a portion of the ions initially present in ion storage layer 515 may be transferred across ion conducting/electrolyte layer 520 to electrochromic layer 530. For example, hydrogen ions ($H^+$) or lithium ions ($L^+$) present in ion storage layer 515 may be driven across ion conducting/electrolyte layer 520 and into electrochromic layer 530. Upon injection of a suitable number of these ions, electrochromic layer 530 may transition into a substantially transparent state. A reversal of the applied voltage or current may effect a reverse flow of ions back into ion storage layer 515, thereby returning electrochromic layer 530 to a substantially reflective state. Once injection of ions in either direction is completed, no sustained voltage is required to maintain electrochromic layer 530 in its present state (i.e., reflective or transparent) of operation. In other words, the transition is nonvolatile.

Accordingly, based on appropriate application of voltages, outer electrochromic layer 310 and inner electrochromic layer 320 may be selectively manipulated into respective reflective or transparent states depending on a mode of operation of mobile terminal 100.

In one exemplary embodiment, electrochromic layers 310 and 320 may include reflective, transitional metal hydride layers (e.g., electrochromic layer 530), with each of layers 310 and 320 having a thickness of approximately 500 to 2500 nanometers. Furthermore, electrochromic layers 310 and 320 may have resulting reflectance of approximately 80-100% in a reflective state and transmittance of approximately 80-100% in a transparent state. Switching times may be on the order of 50 milliseconds to 2000 milliseconds and switching voltages may be on the order of 0.25-3.0 volts.

Figure 6:
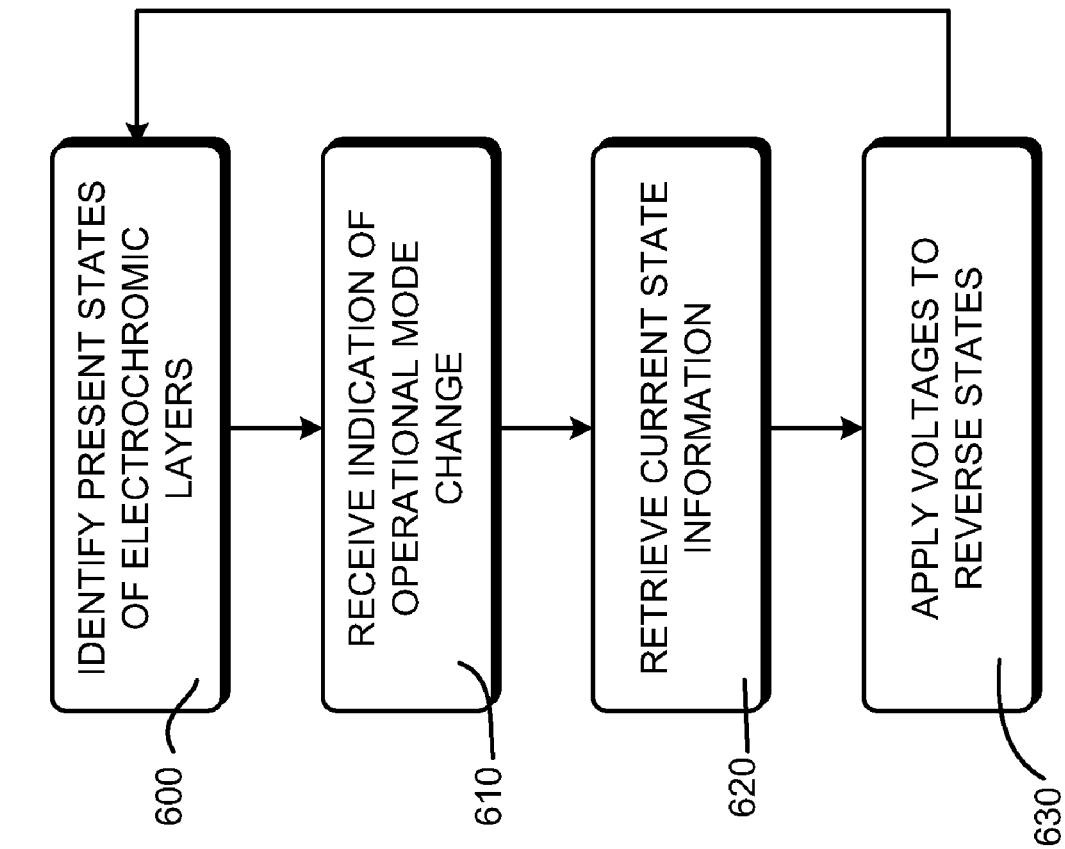
FIG. 6 is a flow diagram illustrating one exemplary implementation of processing for providing a switchable dual-sided display in a mobile terminal in accordance with embodiments described herein.

FIG. 6 is a flow diagram illustrating one exemplary implementation of processing for providing a switchable dual-sided display in a mobile terminal in accordance with embodiments described herein. Processing may being with identification of a present state of the outer electrochromic layer (e.g., layer 310) and the inner electrochromic layer (e.g., layer 320) (block 600). In one implementation, values indicative of a reflective or transparent state for each of layers 310 and 320 may be stored in a table or register, e.g., in memory 220. As described above, a default state for mobile terminal may include the outer display 150 being initially visible via reflective or transflective lighting. Accordingly, in this implementation, outer electrochromic layer 310 may be provided in an initial transparent state, while inner electrochromic layer 320 may be provided in an initial reflective state.

An indication of a change of operational mode of mobile terminal 100 may be received (e.g., at processing logic 210) (block 610). For example, processing logic 210 may receive an indication (e.g., via software means, physical switch means, etc.) that mobile terminal 100 has changed from an open configuration to a closed configuration, or vice-versa. Upon receipt of a mode change indication, the current electrochromic layer state information may be retrieved (block 620). Appropriate voltages may be applied to the respective electrochromic layers to effect a reversal in their respective states (block 630).

For example, in the event that the current state of outer electrochromic layer 310 is transparent and the current state of inner electrochromic layer 320 is reflective, a suitable voltage may be applied to effect a movement of ions from layer 530 in outer electrochromic layer 310 into its respective ion storage layer 515, thereby placing outer electrochromic layer 310 in the reflective state. Simultaneously, a suitable voltage may be applied to effect a movement of ions from ion storage layer 515 associated with inner electrochromic layer 320 into the layer 530 of inner electrochromic layer 320, thereby placing the inner electrochromic layer 320 in the transparent state. The process then returns to block 600 for storage of the current states of the inner and outer electrochromic layers 310 and 320, respectively.

Figure 7B:
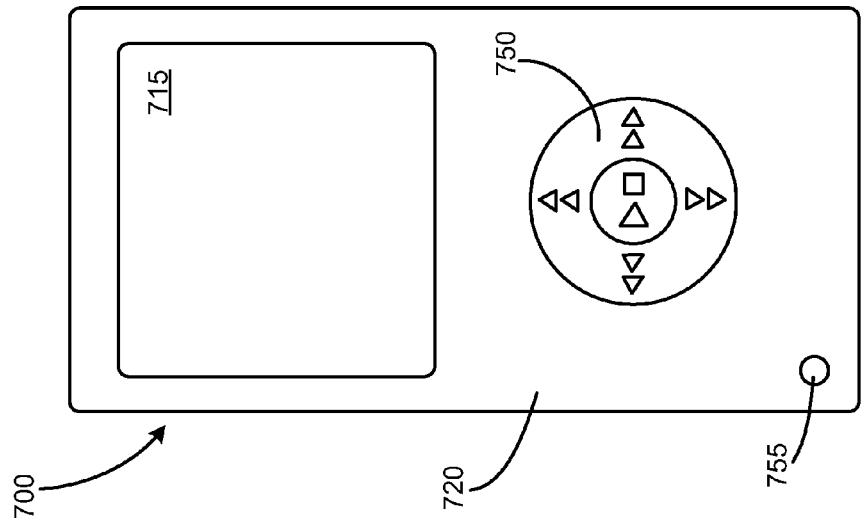
FIGS. 7A and 7B are front and back views of another exemplary mobile terminal in which methods and systems consistent with the invention may be implemented.
Figure 7A:
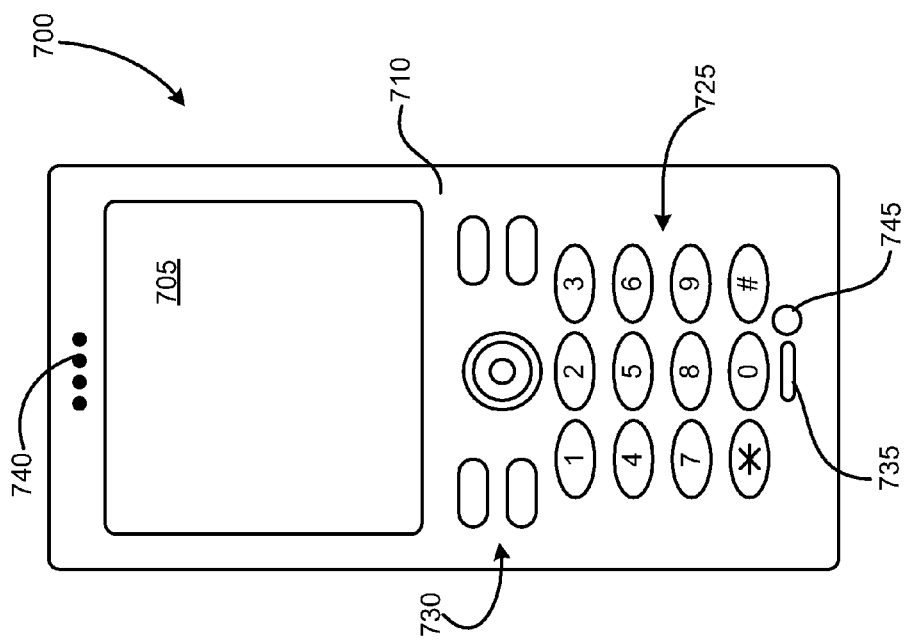

FIGS. 7A and 7B are front and rear views, respectively, of another exemplary mobile terminal 700 in which systems and methods consistent with the embodiments described herein may be implemented. As illustrated, mobile terminal 700 is a stick or candybar form mobile device that include a first display 705 on front side 710 and second display 715 on a second side 720. Furthermore, front side 710 may include keypad 725, control keys 730, microphone 735, speaker 740, and first light sensor 745. Back side of mobile terminal 700 may include second display 710, media control keys 750 and second light sensor 755.

Consistent with embodiments described above, first display 705 and second display 715 may include electrochromic elements configured to enhance the viewability of a display currently being used. In order to determine which display is currently being used, mobile terminal 700 (or a processor associated therewith) may utilize measurements associated with light sensors 745 and 755, with higher ambient light readings being more likely associated with a side of mobile terminal 700 currently being used. In an alternative implementation, a key press on one of keypad 725 or media control keys 750 may indicate which side of mobile terminal 700 is currently being used. In yet another alternative implementation, a motion sensor or gyroscope (not shown) may be used to identify a side of mobile terminal 700 (and hence which display) is currently being used. Depending on the side of mobile terminal 700 being used, a processor associated therewith may control the transparent/reflective state of each display. In some implementations, this control may be effected in substantially real-time, upon change of the display being viewed (e.g., upon turning of mobile terminal 700, etc.).

CONCLUSION

Implementations consistent with embodiments described herein provide increased viewability of dual sided displays by providing electronic switching of electrochromic reflective layers associated with each display. In this manner, a maximum backlight for a display currently being used may be enabled. This has the advantage of increasing usability of the display device in various lighting conditions and requires lower current consumption that embodiments in which high ambient light is countered by increased backlight brightness. In some embodiments, control of the electronic switching of the electrochromic reflective layers associated with each display may be performed in real-time based on a mode of operation, a physical configuration, or lighting conditions associated with the display device.

The foregoing description of the embodiments provides illustration and description, but is not intended to be exhaustive or to limit the invention to the precise form disclosed. Modifications and variations are possible in light of the above teachings or may be acquired from practice of the invention.

For example, while the above-described embodiments primarily relate to mobile device, such as mobile telephones, aspects described herein may also be applicable to other technologies incorporating display technology in variably lit environments. For example, outdoor signage may be provided with a transflective display (e.g., a LCD, a LED display, an OLED display, etc.) a having an electrochromic layer configured to enhance viewability of the signage in the presence of high levels of ambient light. Alternatively, other types of displays, such as device control screens (e.g., video or digital cameras), remote control interfaces, etc., may be configured in accordance with the above-described embodiments.

Furthermore, while a series of blocks and/or processes have been described in FIG. 6, the order of the blocks and/or processes may be modified in other implementations.

It will also be apparent to one of ordinary skill in the art that various embodiments, as described above, may be implemented in cellular communication devices/systems, methods, and/or computer program products. Accordingly, the present invention may be embodied in hardware and/or in software (including firmware, resident software, micro-code, etc.). Furthermore, various embodiments may take the form of a computer program product on a computer-usable or computer-readable storage medium having computer-usable or computer-readable program code embodied in the medium for use by or in connection with an instruction execution system. The actual software code or specialized control hardware used to implement aspects consistent with the embodiments described herein is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A display device, comprising:
    a dual-sided display assembly having a first viewable side and a second viewable side;
    a first ambient light sensor configured to detect ambient light incident on the first viewable side;
    a second ambient light sensor configured to detect ambient light incident on the second viewable side;
    a first electrochromic layer formed over the first viewable side;
    a second electrochromic layer formed over the second viewable side;
    a power supply,
    wherein each of the first electrochromic layer and the second electrochromic layer is switchable between a substantially transparent state and a substantially reflective state upon application of a switching voltage from the power supply, the state being selected based on an operational configuration of the display device; and
    processing logic configured to:
        determine that the dual-sided display assembly is in a first operational configuration when the ambient light detected by the first ambient light sensor is greater than the ambient light detected by the second ambient light sensor; and
        determine that the dual-sided display assembly is in a second operational configuration when the ambient light detected by the second ambient light sensor is greater than the ambient light detected by the first ambient light sensor.

2. The display device of claim 1,
    wherein, when the processing logic determines that the dual-sided display is in the first operational configuration, the processing logic is configured to place the first electrochromic layer into the substantially transparent state and place the second electrochromic layer into a substantially reflective state, such that viewing of the dual-sided display assembly from the first viewable side is enhanced by reflection of ambient incident light by the second electrochromic layer.

3. The display device of claim 1, wherein, when the processing logic determines that the dual-sided display is in the second operational configuration, the processing logic is configured to place the first electrochromic layer into the substantially reflective state and place the second electrochromic layer into a substantially transparent state, such that viewing of the dual-sided display assembly from the second viewable side is enhanced by reflection of ambient incident light by the first electrochromic layer.

4. The display device of claim 1, wherein the processing logic is further configured to determine the operational configuration based on a physical orientation of the display device.

5. The display device of claim 1, where the dual-sided display assembly comprises a dual-sided liquid crystal display assembly.

6. The display device of claim 1, where the dual-sided display assembly includes a backlighting assembly to distribute light from a light source within the dual-sided display.

7. The display device of claim 6, where the backlighting assembly is further configured to provide a direct backlight to the first viewable side and an indirect backlight to the second viewable side, wherein the indirect backlighting comprises reflecting of the backlight off of the first electrochromic layer while the first electrochromic layer is in the substantially reflective state.

8. The display device of claim 1, where the dual-sided display assembly further comprises:
  a first display;
  a backlighting assembly formed over the first display to distribute light from a light source directly through the first display; and
  a second display formed over the backlighting assembly,
  where the first electrochromic layer is formed over the first display, and the second electrochromic layer is formed over the second display.

9. The display device of claim 1, wherein the first electrochromic layer and the second electrochromic layer each comprise a reflective transition metal hydride that includes a magnesium nickel alloy.

10. The display device of claim 9, wherein each of the first electrochromic layer and the second electrochromic layer comprise:
  a first transparent conductor layer;
  an ion storage layer formed over the first transparent conductor layer;
  an ion conducting layer formed over the ion storage layer;
  a reflective electrochromic layer formed over the ion conducting layer; and
  a second transparent conductor layer formed over the reflective electrochromic layer,
  wherein the reflective electrochromic layer formed over the ion conducting layer comprises the magnesium nickel alloy,
  wherein the ion storage layer and the reflective electrochromic layer are configured to receive the switching voltage from the power supply.

11. The display device of claim 9, where each of the first electrochromic layer and the second electrochromic layer exhibit reflectance of approximately 80-100% while in the substantially reflective state and transmittance of approximately 80-100% while in the substantially transparent state.

12. A mobile terminal comprising:
  a main housing, comprising:
    a first light sensor configured to detect ambient light incident on the main housing;
    a processor, and
    a power supply; and
  a flip housing hingedly connected to the main housing, wherein the flip housing comprises:
    a dual-sided display assembly having an inner display and an outer display, where the inner display is viewable from a first side of the flip housing and the outer display is viewable from a second side of the flip housing;
    a second light sensor configured to detect ambient light incident on the second side of the flip housing;
    an outer electrochromic layer formed over the outer display; and
    an inner electrochromic layer formed over the inner display,
  wherein each of the outer electrochromic layer and the inner electrochromic layer are switchable between a substantially transparent state and a substantially reflective state upon a command from the processor to apply a switching voltage from the power supply to the outer electrochromic layer or the inner electrochromic layer, the state being selected based on an operational mode of the mobile terminal, and
  wherein the processor is configured to:
    determine that the dual-sided display assembly is in a first operational mode when the ambient light detected by the first light sensor is greater than the ambient light detected by the second light sensor; and
    determine that the dual-sided display assembly is in a second operational mode when the ambient light detected by the second light sensor is greater than the ambient light detected by the first light sensor.

13. The mobile terminal of claim 12, where the dual-sided display assembly further comprises:
  a backlighting assembly formed between the inner display and the outer display to distribute light from a light source directly through the inner display.

14. The mobile terminal of claim 12, wherein each of the inner electrochromic layer and the outer electrochromic layer include at least a reflective transition metal hydride.

15. A method, comprising:
  monitoring ambient light incident upon a first viewable side of a dual-sided liquid crystal display;
  monitoring ambient light incident upon a second viewable side of the dual-sided liquid crystal display;
  determining that the dual-sided liquid crystal display is in a first operational mode for viewing a first viewable side of the dual-sided liquid crystal display when more ambient light is incident upon the first viewable side of the dual-sided liquid crystal display than is incident on the second viewable side of the dual-sided liquid crystal display;
  determining that the dual-sided liquid crystal display is in a second operational mode for viewing a second viewable side of the dual-sided liquid crystal display when more ambient light is incident upon the second viewable side of the dual-sided liquid crystal display than is incident on the first viewable side of the dual-sided liquid crystal display;
  when it is determined that the dual-sided liquid crystal display is in the first operational mode:
    placing a first electrochromic layer formed over the first viewable side of the dual-sided liquid crystal display into a substantially transparent state; and
    placing a second electrochromic layer formed over the second viewable side of the dual-sided liquid crystal display into a substantially reflective state; and
  when it is determined that the dual-sided liquid crystal display is in the second operational mode:
    placing the first electrochromic layer formed over the first viewable side of the dual-sided liquid crystal display into a substantially reflective state; and
    placing the second electrochromic layer formed over the second viewable side of the dual-sided liquid crystal display into a substantially transparent state.

* * * * *